(12) United States Patent
Mendelson

(10) Patent No.: US 8,896,485 B2
(45) Date of Patent: Nov. 25, 2014

(54) SYSTEM AND METHOD FOR AUTOMATICALLY GENERATING AND UPDATING REAL TIME NAVIGATION WAYPOINT

(76) Inventor: Ehud Mendelson, Coral Springs, FL (US)

( * ) Notice: Subject to any disclaimer, the term of this patent is extended or adjusted under 35 U.S.C. 154(b) by 998 days.

(21) Appl. No.: 11/472,706

(22) Filed: Jun. 22, 2006

(65) Prior Publication Data

US 2007/0069923 A1    Mar. 29, 2007

Related U.S. Application Data

(62) Division of application No. 11/429,864, filed on May 8, 2006, now Pat. No. 8,836,580.

(60) Provisional application No. 60/678,947, filed on May 9, 2005.

(51) Int. Cl.
```
G01S 1/68      (2006.01)
G01S 3/02      (2006.01)
G01S 5/02      (2010.01)
G01C 21/20     (2006.01)
G06Q 30/02     (2012.01)
G06Q 90/00     (2006.01)
```

(52) U.S. Cl.
CPC ............. *G01S 1/68* (2013.01); *G01C 21/206* (2013.01); *G01S 5/02* (2013.01); *G01S 5/0226* (2013.01); *G06Q 30/0239* (2013.01); *G06Q 90/20* (2013.01)
USPC ......................... 342/463; 342/465; 701/467

(58) Field of Classification Search
USPC ............. 342/357.06, 357.13, 452, 463–465, 342/357.21, 357.71, 357.25, 457; 701/211–213, 467, 468, 410, 412; 340/988, 995.1; 455/456.6, 457
See application file for complete search history.

(56) References Cited

U.S. PATENT DOCUMENTS

| | | | |
|---|---|---|---|
| 5,798,733 A * | 8/1998 | Ethridge | 342/357.08 |
| 7,031,875 B2 | 4/2006 | Ellenby et al. | |
| 2006/0122767 A1* | 6/2006 | Athalye | 701/200 |
| 2006/0253226 A1* | 11/2006 | Mendelson | 701/1 |
| 2008/0227473 A1* | 9/2008 | Haney | 455/457 |

* cited by examiner

*Primary Examiner* — Dao Phan
(74) *Attorney, Agent, or Firm* — Allen D. Hertz, P.A.; Allen D. Hertz

(57) ABSTRACT

Method and system to guide people around urban environments indoor and outdoor, provide real time accurate update of way points information to the user navigation system and or to his cellular phone via FM-RDS according to the user location, The information will display on the existing cellular phone or Bluetooth device and interface to existing GPS navigation system.

24 Claims, 9 Drawing Sheets

SYSTEM AND METHOD FOR AUTOMATICALLY GENERATING AND UPDATING REAL TIME NAVIGATION WAYPOINT

RELATED APPLICATIONS

This application is a Divisional Application of U.S. patent application Ser. No. 11/429,864, filed on May 8, 2005 now U.S. Pat. No. 8,836,580, that claim the benefit of U.S. Provisional Patent Application Ser. No. U.S. 60/678,947, filed on May 9, 2005.

FIELD OF THE INVENTION

This invention is directed generally to the field of navigation and, more particularly, to a method to be used for navigation indoors or outdoors for automatically generating and updating real time waypoints along the route.

BACKGROUND OF THE INVENTION

Introduction to location based services:

Location based services (LBS) are rapidly expanding. Outdoor location technologies are mainly based on Global Positioning System (GPS) technologies. GPS is not capable of performing properly indoors, and is therefore inadequate. As a result, indoor location systems are appearing on the market.

The need for a system arises from various market segments and applications. One example in the market is the GPS based systems that use integrated positioning and navigation systems based on GPS receivers as the primary positioning technology. Subsequent to the events of September 11th, the Federal government mandated that GPS capability be included in all cellular phones.

However, the fact that uninterrupted satellite reception is not possible in many locations is a major limitation of GPS based systems. Densely populated areas and radio-frequency-signal shadowed locations, such as urban centers (a.k.a. "urban canyons"), generally do not allow proper operation of GPS, yet it is in these locations that the need is greatest.

There is a clear need for a cost effective system that maintains performance indoors, in urban canyons and in city centers.

Description of GPS System.

The Global Positioning System (GPS) is a satellite-based navigation and time transfer system developed by the U.S. Department of Defense. GPS serves marine, airborne and terrestrial users, military and civilian users. Specifically, GPS includes the Standard Positioning Service (SPS) that provides civilian users with 100 meter accuracy as to the location or position of the user. For military users GPS provides the Precise Positioning Service that is accurate to within 20 meters. Both of these services are available worldwide with no requirement for any local equipment.

View of GPS limitations:

A first limitation of GPS is that upon activation the GPS receiver scans for signals from the GPS satellites. A unit must locate and receive signals from at least four satellites to be able to determine its location. This process of locating the satellites, receiving the data and achieving a position fix can take several minutes. This delay is problematic for many GPS applications.

A second limitation of GPS is that the receiver needs a clear view of the sky to successfully receive signals from the satellites, again under unfriendly RF conditions such as inside buildings, or in "urban canyons" or in the shadows of high buildings, the GPS suffers from multi-path effects and therefore shows poor performance, or none at all.

A third Limitation is limited accuracy: There is a problem of limited accuracy of the civilian GPS signal. While knowing your position to within 50 to 200 feet anywhere on the planet is a major technological feat, it is still not accurate enough, to locate and navigate to an a store in a mall or to empty parking space, where each space measures about 10 feet, and most indoor stores/malls are located where the GPS cannot work effectively.

Existing navigation systems, such as the new mandatory GPS equipped cellular phones, are based on GPS and have the aforementioned limitations.

Another significant factor adding to the limitations of the GPS based systems is the important role of map production; normally a user, requires a map to be as detailed and as up-to-date as possible. The existing maps used by the GPS based systems provide limited detail and are not able to reflect changes on a real time basis, more over there is no mapping for indoor facilities at all. The recent introduction of imagery services, such as Google Earth™ and its competitors, that are offered as an enhancement to GPS at a fee, still provide out of date information, with the unsatisfactory result that users encounter road changes and area development not shown on the maps and imagery.

The most common problem with today's GPS based systems is that•the mapping and the waypoints are not updated on a timely basis. In most areas, the maps provided are not updated and sometimes provide misleading information. Some of the waypoints listed appear to be about 2 years old. The new service like Google Earth provides satellite images that are almost 2 years old and for sure can't provide on-line real-time accurate picture of the existing area and the waypoints.

The present invention focuses on finding a solution to this task by providing a system and method to generate automatically the waypoint along the user route ether indoor, or outdoor. The present invention focuses on the task of interactively guiding the user to a desired indoor and outdoor destination.

The disclosed system and method automatically updates waypoints, by means of an interface to an existing GPS based system, when each point of interest will have an RF tag/sensor that will broadcast an RF signal that will be converted to a GPS waypoint, or they will update the RF broadcaster (e.g. satellite radio or FM radio stations). In response to the RF signal (from the tags/sensors, or the FM broadcasters) the GPS based navigation system will execute the specified file/program that will initiate a process to automatically execute a waypoint generation program.

For some years, local governments in cooperation with various FM radio stations have been putting together an automated way to get real-time traffic data into cars so drivers can avoid traffic. Real time traffic information includes news such as: congestion, construction, traffic accident, recommended alternative routes.

A tag/sensor will be installed at each point of interest. The tag/sensor will broadcast RF or will send information as PAD (Program Associated Data) to a FM broadcaster (satellite radio or FM station) signals that provide relevant, up-to-date and in real time waypoint information that will be received automatically by existing GPS based systems.

The "user" will no longer need to enter his waypoints manually and then wait for the providers of maps or GPS to update their maps with the information (this can take about a year in some cases). This way the "user" will receive the information that he needs when he needs it and where he needs it.

Again, the process could be exclusive of Internet or cellular communications, the communication is directly between the tags/sensor, or directly from the FM broadcaster and the user's GPS. In the event that more information is required it may be necessary to connect to the Internet.

It is believed that sooner or later it will be a standard procedure to install a tag/sensor on every location of interest (waypoint) or any business will provide a waypoint information to the FM or satellite broadcaster to provide "users" with the information. Most stores or POI/waypoints will be willing to pay for a tag/sensor or pay subscription fee to be on the GPS system on the area that will show their location and information on a map. Or they will pay for an annual listing (similar to the yellow pages).

No software is needed; the System will interface with existing GPS. No more late updates from Google, Yahoo etc. Presently GPS providers, map providers and search engines provide: CityNavigator™ and MetroGuide™ Maps that contain many thousands of attractions.

These include: Food and Lodging, Attractions, Entertainment, Shopping, Services, Transportation, Emergency and Government offices. In most areas, the maps provided are not updated and sometimes provide misleading information. Some of the waypoints listed appear to be about 2 years old. Listed Attractions include theme parks, museums, libraries, schools, parks and such. This feature is very useful in an unfamiliar area. Waypoints will be located automatically in the local area and plotted on the map screen. The waypoints can be stored on the GPS database for future access.

The disclosed innovation will revolutionize the GPS based systems and the mapping industry, from GPS, mapping companies' communication providers, car manufacturers to yellow pages and local guides; for the first time the user of a GPS navigation system will have an easy reliable way to reach a destination.

The most common problem with today's GPS based systems is that the mapping and the waypoints are not updated on a timely basis. The disclosed innovation is the solution for this problem. Using the disclosed innovation the user will know where they are, be able to identify landmarks around him accurately, and receive automatic updates directly from the points of interest in the vicinity.

The disclosed innovation is based on RF tag or information to be sent to RF/FM or satellite radio broadcaster for each waypoint or point of interest, each tag or waypoints has its own ID (identifying the waypoint by type, address, etc.). The sensors/tags will broadcast, via RF, to interface with existing navigation; GPS based systems, as a floating information display on the GPS map referenced to the user's location. The floating display will provide automatic waypoint updates and will allow the user to search local providers (waypoints/ store), even without any connections, no communication, Internet or cellular is needed, the communication is directly between the tags/sensor or the FM broadcaster and the user GPS.

Once an individual is in the vicinity of their destination and they switch on your navigation device, they will automatically receive the facility information along their waking route and in all directions around them.

No further action is required, there is no need to send a request or to access the Internet/web or log on and search a database or central system.

Other systems must have bandwidth available, over which to send a request to a central system, or to a database, and then must wait for a response. This takes time!

The disclosed unique approach does not need an Internet bandwidth or cellular communication.

As a result, there is no delay or waiting for communication and access time, the communication is instantaneous, directly between the tags and the user's navigation device.

Additionally, each facility type can color-coded to identify the type of the store etc., e.g. restaurants, men's wear, women's wear etc.

Each color-coded display of facility can be accessed to obtain complete information about the store e.g., automatic waypoint information.

Due to the limitation of the mapping system currently use by the GPS navigation system, the disclosed display method is a unique way to bridge existing devices like cellular phones, in-car navigation and other Bluetooth devices. The disclosed method provides an overlay navigation method display method over the existing navigation system, as a real-time floating display, or as a waypoint to overcome the limitations of GPS based systems and the existing mapping systems where each waypoint will be display in a color code in the circular floating display over existing mapping or even without any mapping at all. The display will allow the user to easy find the location of the waypoint around them.

The display method is a unique way to bridge existing devices like cellular phones, in-car navigation and other Bluetooth devices. The disclosed method provides an overlay add-up display method over the existing navigation system, as a real-time floating overlay omni-directional circular display to overcome the limitations of GPS based systems and the existing mapping systems.

The overlay add-up device/display works without mapping; a VOR like add-up display shows automatically the waypoint in the immediate area without the need for a mapping background. Or the overlay can be displayed over any existing navigation system, such as a car navigation, portable device, or cellular phone with GPS.

The fact is: no digital maps are entirely accurate. A user needs to know which map makers are used by the product that they are interested in and check the maps for the area that they are concerned about. In addition some map databases are created from vector data while others are just scanned copies of paper maps. In addition to mapping data these same map makers can often provide Points of Interest (POI) data. However, a software company might use the maps from one company and the POI data from another. POI data normally takes three forms. One form is of public buildings, parks, airports, and possibly geographic objects. A second form is government locations that include specialized points lists like marker buoys and airplane markers. Finally, there are commercial establishments, which usually includes some information about their product and contact data. Note that the location of commercial places is often derived from the street address and is not based on the actual latitude/longitude location. More over there is the sky rocketing cost of digitizing and updating the POI and the way points.

The task at hand is to provide a solution when the "user" will receive real-time point of interest or waypoints in the area where he is automatically to his existing navigation system or to his cellular phone, the waypoints information can be information that are real-time information update in real-time and can be change according to the waypoints, any of a variety of applications using the disclosed process can provide the information associated with any of the following exemplary applications:

The user may wish to locate an empty available parking space in his vicinity. just think of the empty parking spaces as waypoints.

The user may wish to see and locate the real estate property available in their area according to their location.

The user may wish to locate a specific store in a shopping mall, each store in a mall is a waypoints or a particular aisle in a department store, or a specific item on a shelf.

The user may wish to locate a specific conference room in a convention center, or a point of interest in an amusement park or a point of interest in a museum.

The user may wish to find the emergency exit route in time of emergency or the first response team need to navigate In a facility in emergency situation.

The user may be looking for a train location in a station, or stops in a subway or underground train system. all of that is update waypoint in real-time.

It is believed that the disclosed automatic waypoint update will revolutionize the GPS and Navigation Industry.

For the first time, the user will know what they want, when they want, and according to their location.

The local business owner can introduce the business's content in real-time to the (navigation) users in his area.

The GPS and navigation industry can tap to the huge local advertising market (estimate at 134B in US alone.).

More over the presented invention is not stopping by providing only an Icon.

PRIOR ART

At present, however, no prior art device utilizes the capabilities to display a real-time representation of navigating directly from the waypoints without a central system; and without using a Internet or any bandwidth communication. Also most of systems are designed for the old query type search where interface to Internet and or database central system needed.

The disclosed system automatically detects a signal directly from the waypoints, no communication needed not even cellular communication. Other systems must have bandwidth available, over which to send a request to a central system, or to a database, and then must wait for a response or they need Internet connections. This takes time!

Even if the other systems have bandwidth, they are still based on the existing search concept where the user submits a query, searches, and awaits for the response. All of this is impractical. The disclosed system provides the information automatically, without submitting any query, and the response is according to the user's location.

Again, most of the existing prior arts are based either on a GPS based system or the existing car navigator, that depends on a GPS too.

And the existing mapping that these systems use has the same limitations described previously and is impractical.

It is believed that the disclosed system and associated method bridges a gap between the GPS based navigation and provides a complete solution.

Ellenby et al. (U.S. Pat. No. 7,031,875) describes a pointing system for addressing objects, provide a system and method based on GPS and Internet/database communication, it is not exactly a navigation but a information based system that need the GPS to locate the user location so indoor services is likely out of the questions and the need for communication as well with GPS limit its availability and accuracy.

It is not real-time update of the waypoints and needed Internet and or central database communication.

SUMMARY OF THE INVENTION

In accordance with the present invention, these are the project's characteristics:

The most common problem with today's GPS based systems is that the mapping and the waypoints are not updated on a timely basis. In most areas, the maps provided are not updated and sometimes provide misleading information. Some of the waypoints listed appear to be about 2 years old. The new service like Google Earth provides satellite images that are almost 2 years old and for sure can't provide on-line real-time accurate picture of the existing area and the waypoints.

The present invention focuses on finding a solution to this task by providing a system and method to generate automatically the waypoint along the user route either indoor or outdoor.

The present invention focuses on the task of interactively guiding the user to a desired indoor and outdoor destination.

The disclosed system and method automatically updates waypoints, by means of an interface to an existing GPS based system, when each point of interest will have an RF tag/sensor that will broadcast an RF signal that will be converted to a GPS waypoint, or they will update the RF broadcaster (e.g. satellite radio or FM radio stations). In response to the RF signal (from the tags/sensors, or the FM broadcasters) the GPS based navigation system will execute the specified file/program that will trigger automatically executing a waypoint generation program.

For some years, local governments in cooperation with various FM radio stations have been putting together an automated way to get real-time traffic data into cars so drivers can avoid traffic. Real time traffic information includes news such as: congestion, construction, traffic accident, recommended alternative routes.

A tag/sensor will be installed at each point of interest. The tag/sensor will broadcast RF or will send information as PAD (Program Associated Data) to a FM broadcaster (satellite radio or FM station) signals that provide relevant, up-to-date waypoint information that will be received automatically by existing GPS based systems.

The "user" will no longer need to enter his waypoints manually and then wait for the providers of maps or GPS to update their maps with the information (this can take about a year in some cases). This way the "user" will receive the information that he needs when he needs it and where he needs it.

Again, no communication, Internet or cellular may needed, the communication is directly between the tags/sensor, or directly from the FM broadcaster and the user's GPS. In the event that more information is required it may be necessary to connect to the Internet.

It is believed that sooner or later it will be a standard procedure to install a tag/sensor on every location of interest (waypoint) or any business will provide a waypoint information to the FM or satellite broadcaster to provide "users" with the information. Most stores or POI/waypoints will be willing to pay for a tag/sensor or pay subscription fee to be on the GPS system on the area that will show their location and information on a map. Or they will pay for an annual listing (similar to the yellow pages).

No software is needed; the System will interface with existing GPS. No more late updates from Google, Yahoo etc.

Presently GPS providers, map providers and search engines provide: CityNavigator and MetroGuide Maps that contain many thousands of attractions.

These include: Food and, Drink, Lodging, Attractions, Entertainment, Shopping, Services, Transportation, Emergency and Government offices. In most areas, the maps provided are not updated and sometimes provide misleading information. Some of the waypoints listed appear to be about 2 years old. Listed Attractions include theme parks, museums, libraries, schools, parks and such. This feature is very useful in an unfamiliar area. Waypoints will be located automatically in the local area and plotted on the map screen. The waypoints can be stored on the' GPS database for future access.

Our innovation will revolutionize the GPS based systems and the mapping industry, from GPS, mapping companies' communication providers, car manufacturers to yellow pages and local guides; for the first time the user of a GPS navigation system will have an easy reliable way to reach a destination.

The most common problem with today's GPS based systems is that the mapping and the waypoints are not updated on a timely basis. Our innovation is the solution for this problem. Using the disclosed innovation, the user will know where he/she is, be able to identify "landmarks" around him/her accurately, and receive automatic updates directly from the points of interest in the vicinity.

Our innovation is based on RF tag or information to be sent to RF/FM or satellite radio broadcaster for each waypoint or point of interest, each tag or waypoints has its own ID (identifying the waypoint by type, address, etc.). The sensors/tags will broadcast, via RF, to interface with existing navigation, GPS based systems, as a floating information display on the GPS map referenced to the user's location. The floating display will 'provide automatic waypoint updates and will allow the user to search local providers (waypoints/store), even without any connections, no communication, Internet or cellular is needed, the communication is directly between the tags/sensor or the FM broadcaster and the user GPS.

The fact is: no digital maps are entirely accurate. A user needs to know which map makers are used by the product that they are interested in and check the maps for the area that they are concerned about. In addition some map databases are created from vector data while others are just scanned copies of paper maps. In addition to mapping data these same map makers can often provide POI (points of interest) data. However, a software company might use the maps from one company and the POI data from another. POI data normally takes three forms. One is public buildings, parks, airports, and possibly geographic objects. A second is government locations that include specialized points lists like marker buoys, and airplane marker. Finally, there are commercial establishments, which usually includes some information about their product and contact data. Note that the location of commercial places is often derived from the street address and is not based on the actual latitude/longitude location. More over there is the sky rock cost of digitizing and updating the POI and the way points.

The task at hand is to provide a solution where the "user" will receive real-time point of interest or waypoints in the area where he is automatically to his existing navigation system or to his cellular phone, the waypoints information can be information that are real-time information update in real-time and can be change according to the waypoints, the information can be as the Examples applications:

The user may wish to locate an empty available parking space in his vicinity. just think of the empty parking spaces as a waypoints.

The user may wish to see and locate the real estate property available in his area according to his location.

The user may wish to locate a specific store in a shopping mall, each store in a mall is a waypoints or a particular aisle in a department store, or a specific item on a shelf.

The user may wish to locate a specific conference room in a convention center, or a point of interest in an amusement park or a point of interest in a museum.

The user may wish to find the emergency exit route in time of emergency or the first response team need to navigate in a facility in emergency situation.

The user may be looking for a train location in a station, or stops in a subway or underground train system. all of that is update waypoint in real-time.

It is believed that the automatic waypoint update concept will revolutionize the GPS and Navigation Industry.

For the first time the user will know what they want, when they want the information and according to their location.

The local business owner can introduce his content in real-time to the (navigation) users located in area of the local business.

The GPS and navigation industry can tap to the huge local advertising market (estimate at 134B in US alone).

The navigator.

The navigator, cellular phone application Bluetooth application or existing GPS navigation. The user will receive the data broadcast or by the tags in the vicinity via the interface with a cellular telephone utilizing the cellular phone's Bluetooth capability or from a FM broadcaster via RDS is a standard from the European Broadcasting Union for sending small amounts of digital information using conventional FM radio broadcasts. The RDS system standardizes several types of information transmitted, including time ad station identification. RDS is standard in Europe since the early 90s, but less so in North America.

Radio Broadcast Data System is the official name used for the U.S. version of RDS, though the "RDS" name seems to be at least as common in usage. The two standards are nearly identical, with only slight differences, mainly in which numbers are assigned to each of 31 musical and other programming formats the RBDS system can identify. RBDS was approved by the NRSC, RDS by the EBU. Both use a 57 kHz subcarrier to carry data at 1187.5 bits per second. The 57 kHz was chosen for being the third harmonic (3×) of the pilot tone for FM stereo, so it would not cause interference or intermodulation with it, or with the stereo difference signal at 38 kHz (2×). The data format utilizes error correction.

It is important to note that no cellular communication or Internet or database access is needed, and that any Bluetooth enabled device will operate the navigator application as a stand-alone device. The disclosed system will interface with existing in-car navigation systems. What is suggested is that the waypoint or POI will be represented by the following examples, according to the type of the POI:

| PTY code | POI: type | Waypoint category type |
| --- | --- | --- |
| 32 | Food/Restaurants | Food |
| 33 | Gas Station | Information |
| 34 | ATM/Banks | Finance |
| 35 | Department Store | store |
| 36 | Apparel | Store |
| 37 | Sports | Store |
| 38 | Books/Video | Store |
| 39 | Jewelry | Store |
| 40 | Toys/Photo/Elec. | Store |
| 41 | Music | Store |

-continued

| PTY code | POI: type | Waypoint category type |
|---|---|---|
| 42 | Gifts | Store |
| 43 | Furnishing | Store |
| 44 | Service | Service |
| 45 | Computers | Store/Service |
| 46 | Hairstyle/Cosmetics | Store/Service |
| 47 | office | office |
| 48 | Security/police | Service/emergency |
| 49 | Children's program | Service/store |
| 50 | Social Affairs | Religious service |
| 51 | Religion | Religious |
| 52 | Phone | service |
| 53 | Travel | Transportation service |
| 54 | parking | Transportation service |
| 55 | Guest service | service |
| 56 | Library | service |
| 57 | Transportation | Transportation service |
| 58 | Municipal | |
| 59 | Post office/Mail | service |
| 60 | Government | |
| 61 | Market | Store/service |
| 62 | Alarm | Emergency |

The display method.

The display method is a unique way to bridge existing devices like cellular phones, in-car navigation and other Bluetooth devices. The solution provides the overlay waypoints displayed over the existing navigation system, as a real-time floating display, or as a waypoint to overcome the limitations of GPS based systems and the existing mapping systems.

The disclosed navigation system method will enable remote planning based on downloaded local floor-plans, or local navigation, when the location's floor plan can be downloaded at the destination. An example of this would be at the entrance of a shopping mall, department store, amusement park, museum, parking garage or the down town area of a city.

The system can work inside a building whereas GPS cannot. Local detection is obtained via popular Bluetooth interface.

The system provides information about each facility/store, including information about the type of the facility, for example: type of store or product etc.

By providing the ability to locate a the user in an area using a Bluetooth enabled device, or a cell phone with the disclosed navigation application, the system overcomes the anxiety of "Where will I am" and also facilitates finding a parked car later via the RTP (Return to Parking) feature.

The system has the capability to perform all the functions of a search for and can become the "Next generation search out of the box".

The disclosed system can be an attractive additional feature for cities that intend to deploy Wi-Fi.

In case of an emergency or security situation, the system can provide authorities with information.

Utilizing the disclosed innovation, the facilities (waypoints) in the vicinity around the "user" car are displayed on a floating overlay using either a cellular phone application, or a stand-alone device, or an existing installed navigation system with or without any mapping.

The recent introduction of imagery services, such as Google Earth and its competitors, that are offered as an enhancement to GPS at a fee, still provide out of date information, with the unsatisfactory result that users encounter road changes and area development not shown on the maps and imagery.

Navigation using the mapping or floor-plan of a location can be offered as an additional service.

The option of downloading a floor-plan can be exercised either remotely or locally.

With the disclosed innovation, you have the information that you want, when you want it, where you want it (and at an affordable price).

Once you are in the vicinity of your destination and you switch on your navigation device, you will automatically receive the facility information along your waking route and in all directions around you.

No further action is required, there is no need to send a request or to access the Internet/web or log-on and search a database or central system.

Other systems must have bandwidth available, over which to send a request to a central system, or to a database, and then must wait for a response. This takes time!

Even if the other systems have bandwidth, they are still based on the existing search concept where under the user submits a query, searches and awaits for the response. All impractical while the user need the information immediately. The disclosed system provides the information automatically, without submitting any query, and the response takes into account the user's location.

The disclosed unique approach does not need an Internet bandwidth or cellular communication at all.

And as a result there is no delay or waiting for communication and access time, the communication is instantaneous, directly between the waypoints and the user's navigation device.

Additionally, each facility type can color-coded to identify the type of the store etc., e.g. restaurants, men's wear, women's wear etc. the store type, real estate property, garage sale location, special sale and all up to date real time information that can't be display and locate in today navigation system, and tapping to the local business industry know as local advertising.

Each color-coded display of facility can be accessed to obtain complete information about the store e.g., automatic waypoint information.

The ability to operate the disclosed innovation using the associated application on a cellular phone, the navigator, with no need for cellular connection, or on any stand alone Bluetooth enabled device, and not limit to a GPS navigation system.

Moreover, the disclosed innovation can solve the "RTP" (Return to parking) problem, where many forget where they parked their car. The system has an option to save the location on the "cellular phone—parking detector" application, that will make it easy to locate the parked car.

The disclosed solution is designed for global use and is not limited to malls, stores, amusement parks, museums, sports stadiums etc. It can be implemented in parking garages or parking spaces metered or not, almost anywhere and in any place.

In the future, all new construction will have the tags included in the design.

The disclosed invention integrates the navigation as part of the NAV4 concepts where it will provide complete solutions for local navigation in an area where the GPS and GPS mapping just can't provide accurate and update information that so essential to the user.

A typical application is navigating a pedestrian in an environment like a mall, department store, specialty store, conference, trade show, amusement park, university, hospital, school, municipal building, museum, subway, train station, airport, down town center, any type of parking facility, or any place when and where GPS cannot be provided or is not accurate or precise enough. The system will be used for navigation by first responders to emergencies or disasters.

The disclosed system method is part of the broad suite of applications that include a complete solution to the "user" from the time that he parks, or begins looking for a space to park his car, walking to the store/mall to when he wants to return to his parked car, looking for the place that he parked.

The suite includes:

Parking detector—and navigation to the empty available parking space.

Nav4 mall/store navigation solution inside mall store.

RTP—return to parking—locate the place that you parked your car.

For example, a typical application could be:

A pedestrian asks the way in a mall to a specific store.

A pedestrian asks the way inside the store, to a specific aisle or product.

A shopper in a department store asks for a specific department.

A pedestrian asks the way to a point of interest.

In an emergency, the first response team has to navigate inside a smoke filled building.

A system and method to provide user information which related to the point of interest.

The disclosed system provides detection and navigation reference, position determination and information related to the object—point of interest, directly and automatically to the user interface—cellular phone without any communication help of Internet/web or cellular needed.

Special operation mode:—Shopping—NAV4SALE— provides navigation to the special sale item in a department store. A new unique tool for the business owner as well to the customers—to navigate and locate Item in a store/mall that is on a special sale, will provide the "user" a way to navigate in/out door for the "waypoint" represent special sale, coupon, special event, promo etc . . . an add-on to local advertising.

The local advertising market estimates to be $134 Billion in the US alone . . . , the mapping is the "forefront" of a local strategy, due to the lack of availability of the GPS indoor as well with the limitation of its accuracy outdoor and the un-updated of the mapping that provides today by the mapping and GPS industry there is no real tapping to this huge market.

It is believed that the disclosed innovation can bring a new life to the navigation and mapping industry by providing a unique innovation that combines the GPS and the existing navigation as well as the cellular phone users with an indoor navigation based on the local map/mall that will provide the user a navigation to his desire location in the mall/store to the right store/product even isle inside the store as well a new marketing tool to the store/mall owner to get the customer with a new service. A new unique way to bring the customers to the product in sale . . . , direct the customer directly to the isle and to the product that you want to move. The store will also have an option to deliver more content (advertising, sale, coupons, promo etc.) to the user when he approach the store or already is inside via Bluetooth push to the user cellular Bluetooth enable.

Special operating mode:—Museums—NAV4Museums NAV SHOW and NAV CONFERENCE provides navigation and interactive information from the museum's show or conference exhibition to the "user's" cellular phone device via Bluetooth interface.

Explore museum or conference show exhibits in a new unique and easy way, find your way around when navigating on the floor map of the museum conference or the show, indoor navigation, navigate to exhibits restaurants, cafes, lavatories etc., all to the "user" navigation or cellular phone.

Any Museum, Conference, or show provided to the attended a mapping to the exhibits, some provide also additional audio device (headset) to get more information on the exhibits.

The disclosed innovation will provide a unique indoor tools that will allow the attended to navigate the museum, conference or show in an easy way directly to his Bluetooth enable cellular phone, when he reach his desire exhibit he will allow to download directly to his cellular and or Bluetooth headset information about the exhibits. An indoor navigation to the exhibits as well to the restaurants, cafes, lavatories etc . . . . All to the "user" navigation or cellular phone and based on the facility map.

Special operating Mode: Navtrain—For all the users of mass transportation system the disclosed innovation will allow, locate and point the "user" to the exact station or location on a route, an easy way to navigate in the train, subway, underground kind of system, a new way of "subway" or bus mapping in/out door. And directly to the user navigation or his cellular phone. Every day millions of people are using the mass transportation system, trains, subways, buses, each of the passengers depend on the transportation map for the route information as well as, schedules and additional services provided by the transportation system. Most of the passengers of today carry with them a cellular phone.

The disclosed unique innovation will provide the passenger with the navigation inside the transportation system directly to the passenger's Bluetooth enable phone, the passenger will know exact location/station on the route as well with additional option information like schedules. A new add-on service to the transportation providers as well to the passengers, utilize the disclosed indoor navigation method.

Special operating mode:—Parking—NAV4PARKING (described in two prior Parent patent applications), provide empty parking space detection and navigation.

A new generation of urban parking innovation that answers the most demanding need of any driver—Knowing where to park . . . !, or more precisely, find and navigate to the empty parking spaces in and around the driver. Also will provide answer to "where did I park my car?" syndrome, when returning to the parked car. In our society where time, convenience and comfort are precious commodities parking is a major perk, or major headache.

Parking Detection System is the next generation of urban parking and the answer to the most demanding need of any driver—Where to park?

The disclosed system, a method of self organizing sensors' network will enable municipalities and other parking authorities to easily identify, exploit and manage revenue opportunities while at the same time providing better service at a lower operating cost. With the implementation of the disclosed system, navigating and detecting available parking spaces will become part of the information revolution.

With the disclosed system, drivers will save time and reduce the frustration of hunting for parking spaces, and will also save money on gas use and car maintenance costs.

By using and modifying existing technology, the disclosed system will integrate easily with other transportation and communication systems. The RF sensor can be attached to existing parking. meters, and in the future will interface with them and eventually will replace them.

Municipalities will have better control and centralized monitoring of their parking space inventory, resulting from the new generation of urban parking.

Special operating mode: NAVRealty—A new unique tool to accommodate the real estate industry by providing the seller/the real estate agent as well as the real-estate customer to locate and navigate to the available real estate property in the "user" area, according to his location and directly to his GPS navigator and or cellular phone.

According to the newspaper association of America, the real estate advertising market is estimate at $11.5 Billion. Recently Mynewplace joined•apartments. corn and rent. corn in the $3 Billion on-line apartment listing Zillow™, a new startup company just raised $32M in founding with base idea to put your house on Google Earth-satellite mapping. Google, Yahoo, AOL, ASK and Microsoft are looking to develop real estate product.

It is believed that the disclosed unique innovation bring the listing to the user's hand, by combining the GPS navigation and or cellular phone the user will be allowed to get the real estate property in his area according to his location in real time without need for any communication, Internet or cellular.

The user even will have the option to "search out of the box" of property in his area. The disclosed innovation will serve as a new tool for the real estate industry as well to the search eng. For the benefit of the seller/the real estate agent as well as the real-estate customer.

Special operating mode:—NAV4STORE and NAVMALL provides navigation inside a store/department store to a specific department/aisle or specific product, with option for advertising method and special promotion. Explore the indoor mall or inside a department store, navigate to the right place or the store or the department that you need.

Navigate on the mall map/store mapping to find your way around all using your cellular phone or navigation system without a GPS. A new kind of service and new marketing way for the malls/store business owners; an add-on to local advertising.

The local advertising market estimates to be $134 Billion in US alone . . . , the mapping is the "forefront" of a local strategy, due to the lack of availability of the GPS indoor as well with the limitation of its accuracy outdoor and the un-updated of the mapping that provide today by the mapping and GPS industry there is no real tapping to this huge market.

It is believed that the disclosed innovation can bring a new life to the Navigation and mapping industry by providing a unique innovation that combine the GPS and the existing navigation as well as the cellular phone users with an indoor navigation based on the local map/mall that will provide the user a navigation to his desire location in the mall/store to the right store/product even isle inside the store as well a new marketing tool to the store/mall owner to get the customer with a new service. The store will have also an option to deliver more content (advertising, sale, coupons, promo etc.) to the user when he approach the store or already is inside via Bluetooth push to the user cellular Bluetooth enable.

Special operating mode:—NAVThemePark—Theme and amusements Park navigation, navigate to your desire attraction as well with a new way for register to a "fast pass" kind off lane . . . all in a easy way to the "user" cellular phone without need for GPS. Provide a new media and—on service.

Ever wonder what it will be like to navigate inside the amusements park to the desire attraction to know the schedules of the shows events at the attractions and even to get your "fast pass" like from a remote instead of standing in line.

With the disclosed unique innovation all can be become reality and directly to your cellular phone without the need for a GPS. It is believed that the disclosed innovation can provide a new tool and service to the benefit of the amusements parks as well to the user.

Special operating mode:—NAVSIGN—will provide the user with automatic generating waypoint of the road sign to be display on the user navigation and or cellular phone as a way for secure driving, the information can interface to the car computer to for example automatically slow down when enter school zone—NAVSIGN.

Special operating mode:—NAV EMERGENCY: One of the important features of the disclosed indoor navigation techniques will enhance the ability of tactical team's first response team to navigate within the buildings in which it has been deployed.

The disclosed method provides a low-cost, reliable system for firefighters and other first responders, inside buildings, to navigate, where a GPS is not reliable-indeed, the GPS signal may have been disabled temporarily to prevent exploitation by terrorists, or even more likely no signal can be received at all inside a building.

The disclosed system envisioned this limitation of GPS based systems, and is intended for an environment that is potentially much less "friendly", the environment inside a building that first responders encounter may contain smoke, dust, or flames, and is intended to leverage advances in ubiquitous RF/Bluetooth tag technology.

The disclosed system will exploit the capability of storing critical building information, such as the floor maps and the emergency escape plans, for retrieval and navigational assistance via a Bluetooth enabled cellular phone, when and where it is needed, More over the disclosed system can serve as a navigator for the emergency exit route when and where needed each user can load the emergency exit floor plan and escape with the knowledge of his exact location in that route.

Aspects of the scenarios to be included:

Identifies and tracks the user (a first response team member).

Provides the user with navigation information and directions for safely exiting of the building.

Provides location information of all team members, via an ad hoc network of radio terminals that combine RF/Bluetooth readings and radio communication.

From the outset, the disclosed system was been designed with the capability to utilize existing technology so it can be deployed as a stand-alone system, or in tandem with existing systems. We focused on technology already in place that simply needs to be expanded.

With the implementation of the disclosed system, a FIRST RESPONSE TEAM will be empowered to navigate and find its way in a case of emergency or a disaster. This capability can be a critical life saving power in modern congested urban living conditions, not available before now.

It is believed that implementation of the disclosed system will assist counter terrorism activities and more importantly will help the first response teams to save the lives of people trapped inside buildings.

It is believed that implementation of the disclosed system will assist counter terrorism activities and more importantly will help the first response teams to save the lives of people trapped inside buildings. It can save life.

Waypoint Navigation

A waypoint is a fixed location with known address location, longitude and latitude and coordinates. The disclosed navigation system is capable of storing a database of waypoints for the following purpose:

Waypoints mark a destination, a point along the way to a•destination, or a point of reference. Normally, in navigating, a "route" consists of one or more waypoints. To traverse a route, the user navigates to the nearest waypoint, then to the next one in turn until the destination is reached. The system has the ability to compute a great-circle route towards a waypoint, enabling them to find the shortest route even over long distances. The system enabling users to locate a destination on a map and define it as a waypoint. The system is intended for navigation; it can generate a suggested route between two waypoints, based on the cartographic database. The system indicates the user's current location and gives advance notice of an upcoming point.

Because the system knows the waypoint positions, and the distance between them it, it is easy to determine the "user's" exact location.

Map Matching

The navigation solution is further enhanced, although it is not essential, when the system knows that the person or object being located is traveling along known routes on a map; for example, the system can assume that people can only follow certain routes in a mall. This is priori information that can be used to "force" the estimated position to be on the nearest point on the possible routes. The constraints of indoor construction similarly can be used to refine estimates of the position of a person or object moving within a building-people•and objects do not pass through walls, they pass along corridors and through doorways. It is a best solution for a system in case of an emergency or for a system for homeland security or a system to locate and inform the subway location, a good example is the hotel exit floor map.

In all, the disclosed unique method can be summarized as following:
  Direct communication between the area (waypoints) and the user (navigation/GPS).
  Automatic waypoint generation in real-time according to the user area.
  Indoor/outdoor even without GPS.
  Business model when the business/store owner will be subscribe to be listing in the navigation/GPS mapping Provide overlay floating model to be work even without mapping No Internet or cellular communication needed.
  Can utilize the RDM or FM broadcasting to be interface to the existing navigation system.

The option of search is done locally on the user device, no central database or Internet search needed Bluetooth interface to cellular phone, will run as application on the Bluetooth enable device as cellular phone Provide indoor navigation and indoor facility mapping and navigation.

All GPS navigation system lacks of real-time display of the waypoints around the driver/user route, most likely, the information of the GPS mapping are old and not so accurate.

The disclosed system—a system and method for generate and update in real time navigation's waypoints automatically along the route will offer for the first time delivering real time waypoint information along the user route directly to the user navigation and or his cellular phone.

The disclosed system will enable a circular omni-directional display of color code waypoint floating overlay on existing navigation map provided by the GPS providers system.

The waypoint data generate directly from the waypoints, no Internet or cellular communication may need.

The disclosed system will bridge the existing navigation system and GPS mapping to new real time information according to the user location.

The disclosed system will allow for the first time to the navigation and GPS industry to tap to the local advertising market estimates to be $134 Billion in US alone . . . , the mapping is the "forefront" of a local strategy, due to the lack of availability of the GPS indoor as well with the limitation of its accuracy outdoor and the un-updated of the mapping that provide today by the mapping and GPS industry there is no real tapping to this huge market.

It is believed that the disclosed innovation can bring a new life to the Navigation and mapping industry as well to the cellular providers by providing a unique innovation that combine the GPS and the existing navigation to the real time information directly from the waypoints, or as coined a new COOLSPOT.

BRIEF DESCRIPTION OF THE DRAWINGS

A better understanding of the present invention may be obtained by reference to the accompanying drawings, which should be considered in conjunction with the detailed description, all in accordance with the present invention.

DESCRIPTION OF THE PREFERRED EMBODIMENT

Figure 1:
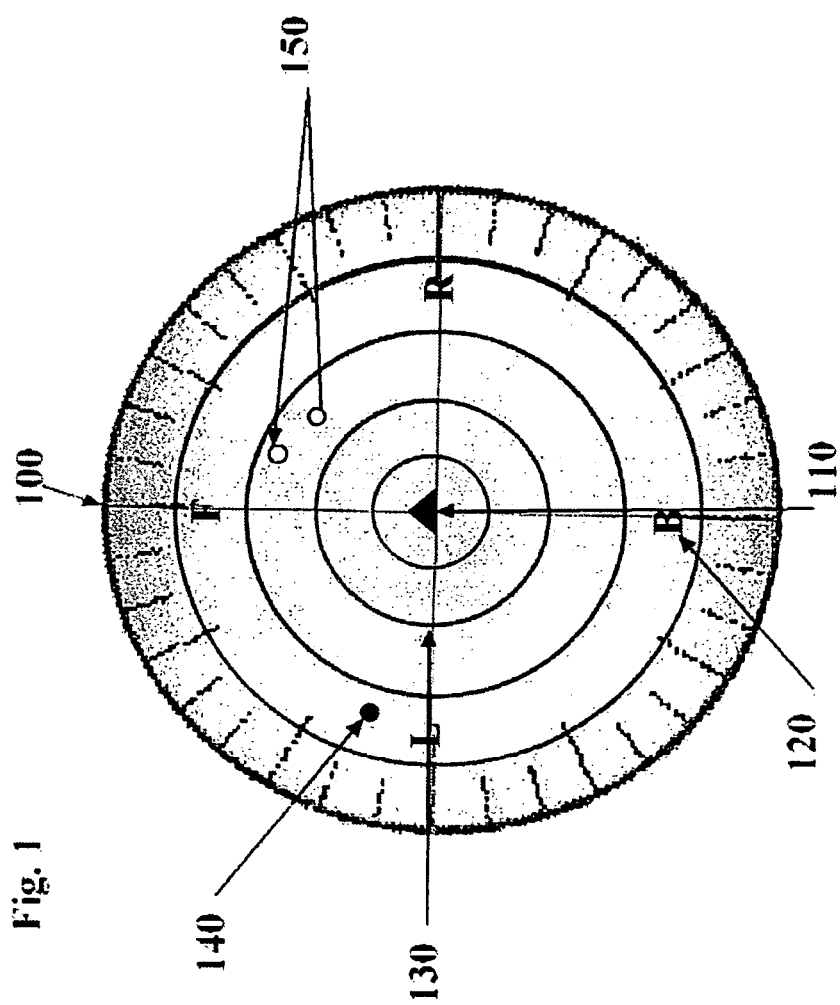
FIG. 1 is an illustration of an option of floating display method as application on a cellular phone or existing GPS navigation in accordance with the present invention.

In all the figures of the drawings, sub-features and integral parts that correspond to one another bear the same reference symbol.

Referring now to the drawings in detail and first particularly to FIGS. 1-9 thereof.

These figures illustrate the method and system to generate and display automatically waypoints along a route for navigation system or application on a cellular phone.

Referring to FIG. 1, its show The method contain the floating overlay display 100, a real-time floating overlay omni-directional circular display to overcome the limitations of the GPS based systems and the existing mapping systems.

The "user" will have easy way to figure out the distance and the direction to the waypoint without GPS or any mapping.

The waypoint will be displayed inside the graphical real-time omni-directional circular display in such way that the "user" will intuitively determine the distance and the direction to the waypoints.

Each waypoint will be shown with a simple color code to identify the type of the waypoint e.g. 150 for example with green color will represent a restaurant where 140 in color red for example will represent a Gas station and so on for each king of waypoints.

Each color code display of an waypoint can be access to obtain complete information about the waypoint e.g. business type and automatic waypoint information.

Each circular line 130 represents 50' in distance from the "user"/car. This makes it easy for the "user" to calculate the·distance to the waypoints.

Moreover to make it easy to determine the directions and the location of the waypoints 140 and 150 the display circular divide to 4 parts represent as 120 B=back to the driving direction 110 as represent the car heading, R=as the right to the "user" driving direction and L=left to the driving direction as well as F=as front forward to the "user" car heading direction.

Each of the waypoints 140 and 150 are result of the broadcast directly from the waypoints in the area of 300' around the "user" car or broadcast a FM signal (ROS) via FM broadcaster or cellular radio provider.

A very small RF sensor installed in each waypoints, any place designated as waypoints ether store, parking space, real estate property for sale, places on the road inside or outside public or commercial. the sensor can be RFID (long range type), a long range Bluetooth a Wi-Fi or any RF type. It broadcast a unique ID by wireless that identifies the location of the waypoints 140 and 150 (unique IO, address, and type). it to be pick up by the detector 100.

Or each of the waypoint will send information to the FM broadcaster ether FM station or cellular radio that will be sending RDS FM information to interface with the existing GPS system and will show on the circular display with the color code.

The overlay add-up device/display can work even without mapping at all, the VOR like add-up display will show the waypoints in the immediate area without the need for a mapping background; No regenerating of mapping is necessary.

Figure 2:
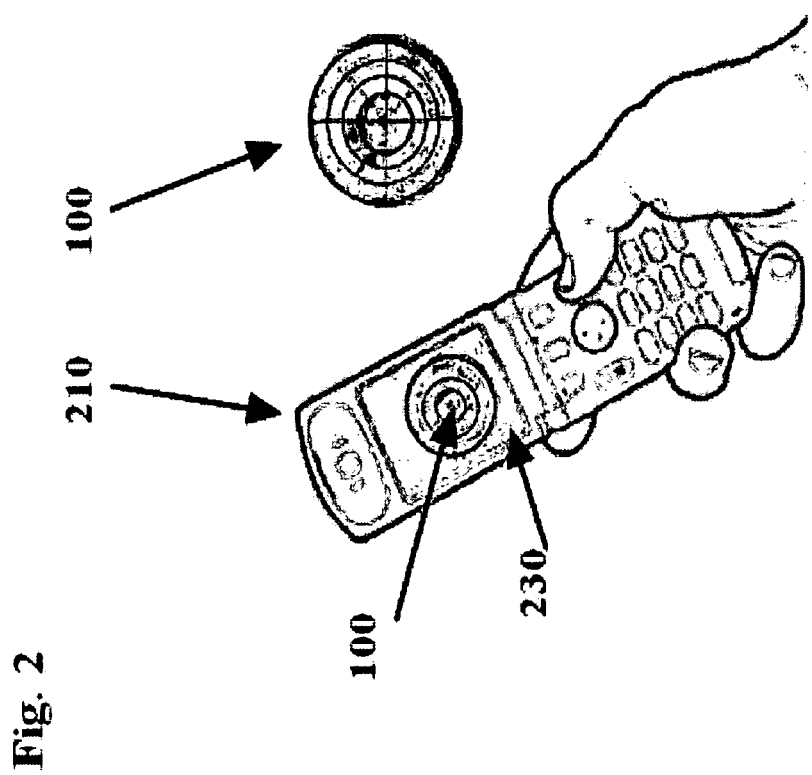
FIG. 2 is illustration of the cellular phone navigation as an application in accordance with the present invention.

Referring to FIG. 2, its show the floating overlay waypoint detector 100 on cellular phone 210 as a Bluetooth cell phone application, there is no need for cellular communication or any Internet web communication or any central system nor any access to a database.

We utilize the cellular phone 210 only as a Bluetooth enable device and the application overlay floating circular display 100 waypoint detector will run over ether GPS existing mapping or over a background of the area floor plan 230 that can be ether download before access the parking area, or inside store/mall building to plan ahead or download via Bluetooth or Wi-Fi at the entrance to the indoor area.

Again, the mapping 230 or floor plan background is not critical to the navigation as the "user" will have easy time to determine and locate and navigate to the waypoint (example to empty parking spaces) without the background mapping or the floor plan, no generation of mapping needed at all.

Moreover by making the cellular phone 210 a waypoints detector even without any communication ether cellular or Internet and using the telephone as a Bluetooth device any "user" even if his car not equipped with built-in navigation will have the option to determine the area waypoints and use his telephone as navigator.

It must be explain that there is a deference between using the cellular phone 210 to receive information from the web or central database to the method when the cellular phone using the waypoint detector Bluetooth application will received directly information broadcast directly from the area waypoints.

Figure 3:
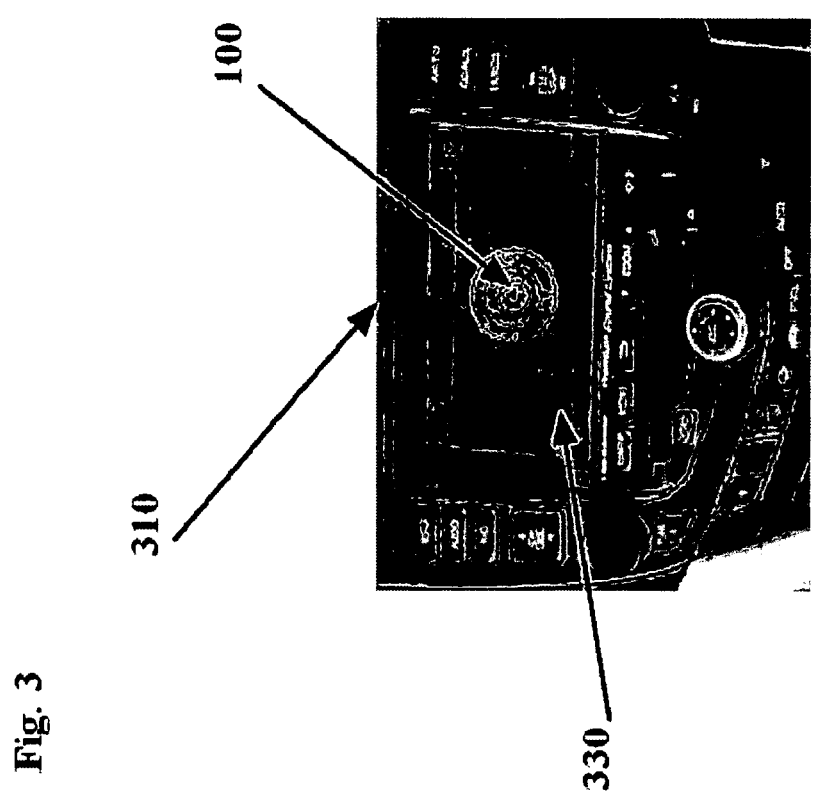
FIG. 3 is illustration of the car navigation with the display method in accordance with the present invention.

Turning now to FIG. 3. It is. show the floating overlay waypoints detector 100 on a car navigation system 310 as an interface to the existing navigation system.

the floating detector 100 on the car navigation 310 as a Bluetooth interface, there is no need for cellular communication or any Internet web communication or any central system nor any access to a database.

the overlay floating circular display 100 detector will run over ether GPS existing mapping or over a background of the area floor plan 330 that can be ether download before access the area to plan ahead or download via Bluetooth or Wi-Fi at the entrance to the mall/store indoor or outdoor.

Again, the mapping 330 or floor plan background is not critical to the navigation as the "user" will have easy time to determine and locate and navigate to the waypoints without the background mapping or the floor plan, no generation of mapping needed at all.

Figure 4:
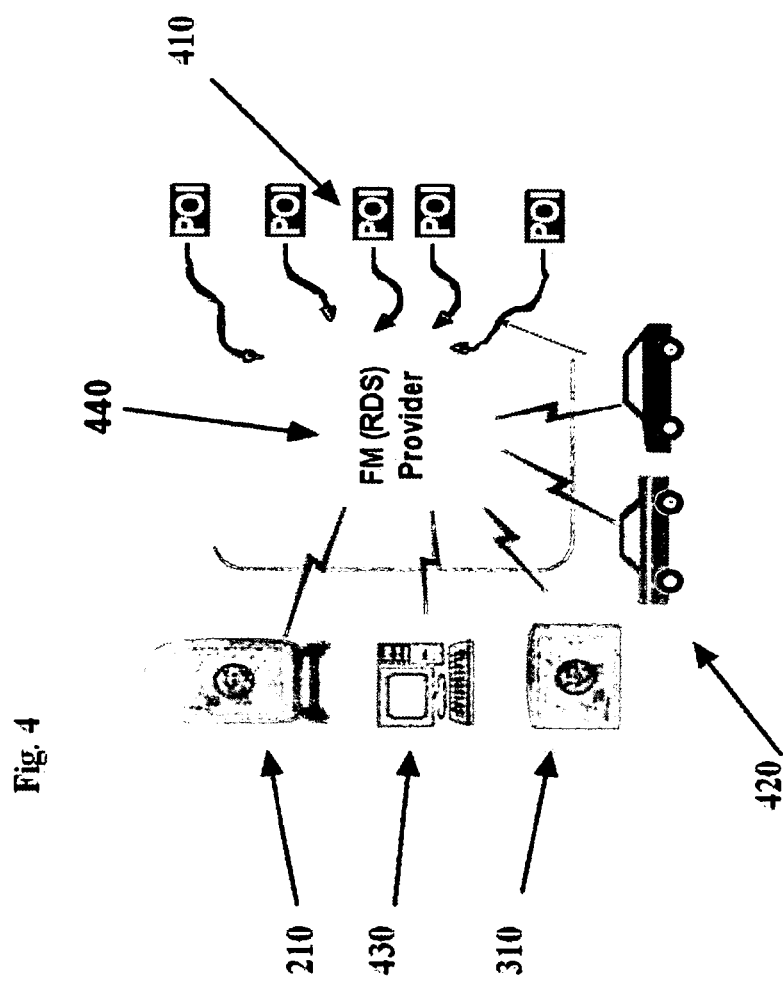
FIG. 4 is an illustration of the automatic update of the waypoints using the FM broadcaster (RDM) method in accordance with the present invention.

Referring to FIG. 4. This figure shows an illustration of the system method, when each waypoints 410 POI (point of interest) send information to the FM providers 440 (waypoints information) the FM Providers or the cellular radio broadcast that information via RDS to the user where each store/waypoint 410, will have a basic information—waypoint information, like the store name, phone number, floor, address within the mall, and a small notes—small information representing the store. The user will receive the information automatically in real time when he according to the area he is to his 420 car to his 310 car navigation and or to his cellular phone 210.

Figure 5:
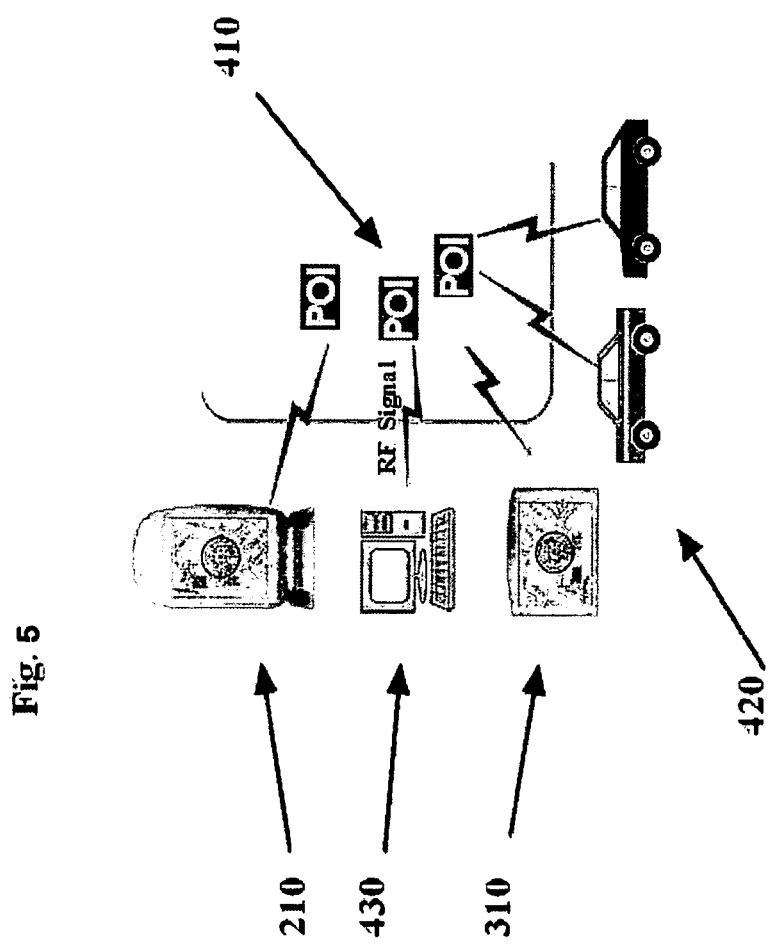
FIG. 5 is an illustration of the automatic update method of the waypoints directly between the waypoints and the user navigation in accordance with the present invention.

Turning to FIG. 5. This figure shows the method of the system when the user reach the area close to the waypoint 410, Again when the user approaches a way point 410 he will be able to receive additional information regarding the store/product directly from the waypoints on his cellular phone/Bluetooth device 210 or to his car navigation 310 in his car 420 e.g. special promotions, coupons, advertising or special sales to the phone as Bluetooth application.

The promotion can be also delivering via Bluetooth voice option utilize the Bluetooth options.

Figure 6:
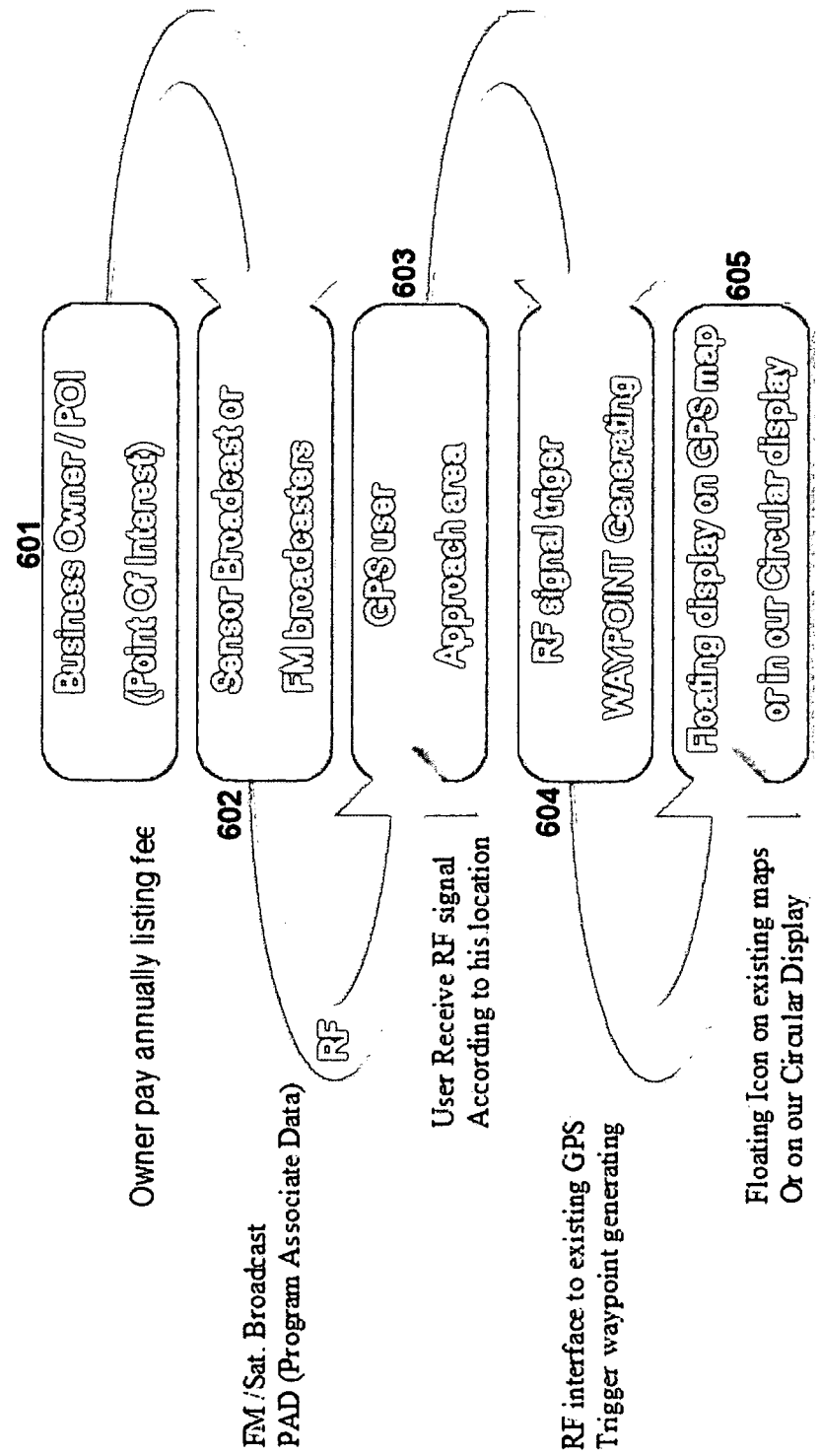
FIG. 6 is an illustration of the business model for the automatic way points update in accordance with the present invention.

Referring to FIG. 6. This figure shows an illustration of business model that implement in the method when each waypoint can be designated as business owner/store or POI (point of interest) 601 will pay annually listing fee to be interface to the GPS as a waypoint almost like the yellow pages but a real-time on-time application, each waypoint will send information to the FM broadcaster (or cellular radio) 602 that will send/broadcast an PAD VIA RDS (Program Associate Data) to be interface to the user GPS navigation 603, the information receive by the Navigation 603 will trigger waypoint generation 604, and will be display on a GPS mapping or without any mapping at all in a floating circular display 605.

Figure 7:
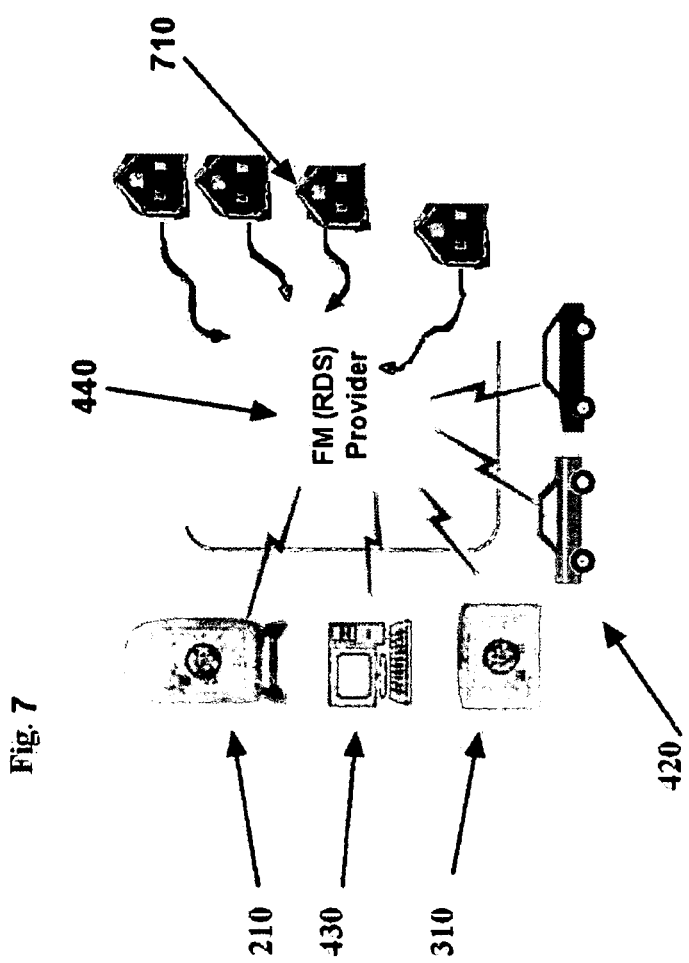
FIG. 7 is an illustration of the automatic update method of the waypoint as describe in FIG. 4 with example of the NAV REALTY application in accordance with the present invention.

Turning to FIG. 7, it show one application, NAV REALTY when and where each real estate property For sale rent in the area around the user can be shown in the unique approach, the waypoint in this example are real estate property 710, that send information to the FM provider 440, the FM provider or the cellular radio broadcast the waypoint information/real estate 710, to the user car 420, to his car navigation 310, and or to his cellular phone 210, automatically according to the user location directly between the waypoint/real estate in this example and the user navigation. The waypoint 710 can be also store outdoor or indoor. The disclosed application method—NAV STORE, NAV MALL, and the waypoints can be parking spaces indoor or outdoor in the application—NAV PARKING, a special sale—the application—NAV SALE, an exhibit in a museum or show or conference—the NAV MUSEUM, NAV CONFERENCE AND NAV SHOW, or exhibit and attractions in amusements parks in the NAV THEME PARK or train location and information in the NAV TRAIN or exit emergency information In the NAV emergency, in all the system provides a real-time and automatic waypoint generation along a route with interface to the existing GPS navigation and to the cellular phone.

A typical application is navigating a pedestrian in an environment like a mall, department store, specialty store, conference, trade show, amusement park, university, hospital, school, municipal building, museum, subway, train station, airport, down town center, any type of parking facility, or any place when and where GPS cannot be provided or is not accurate or precise enough. The system will be used for navigation by first responders to emergencies or disasters.

The method describe is the basic for the suite of application The suite includes:

Parking detector—and navigation to the empty available parking space.

Nav4 mall/store navigation solution inside mall store.

RTP—return to parking—locate the place that you parked your car.

For example, a typical application could be:

A pedestrian asks the way in a mall to a specific store.

A pedestrian asks the way inside the store, to a specific aisle or product.

A shopper in a department store asks for a specific department.

A pedestrian asks the way to a point of interest.

In an emergency, the first response team has to navigate inside a smoke filled building.

A system and method to provide user information which related to the point of interest (POI).

The disclosed system provides detection and navigation reference, position determination and information related to the object or point of interest (POI), directly and automatically to the user interface-cellular phone without any communication help of Internet/web or cellular needed.

Figure 8:
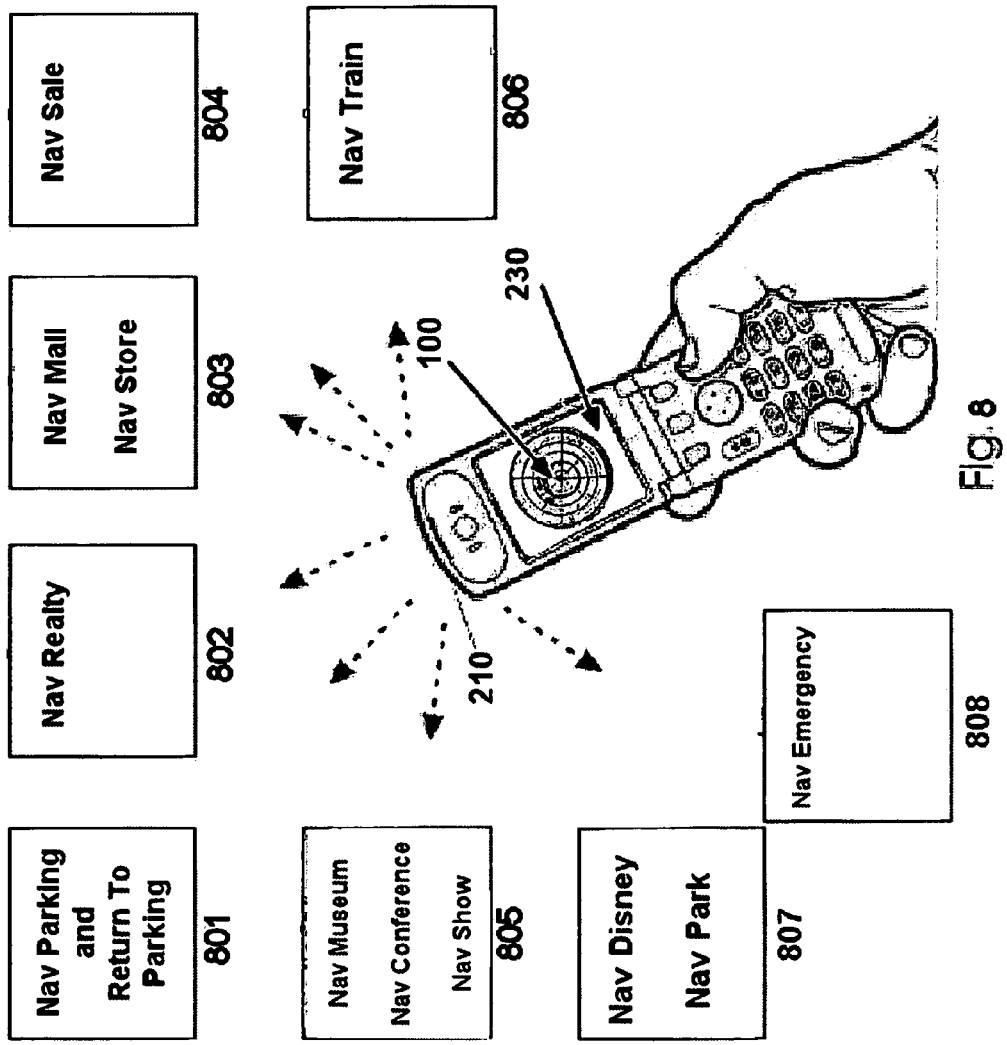
FIG. 8 is an illustration of the application for the automatic waypoint update utilizing a cellular phone in accordance with the present invention.

Turning to FIG. 8. is an illustration of the possibility application for automatic waypoints generation utilize a cellular phone 210 with the floating circular method 100 running and floating on GPS mapping in the background 230 or without any mapping.

Special operating mode:—Parking—NAV4PARKING and Return to Parking 801, (described in two parent patent applications) provide empty parking space detection and navigation.

A new generation of urban parking innovation that answers the most demanding need of any driver—Knowing where to park!, or more precisely, find and navigate to the empty parking spaces in and around the driver. Also will provide answer to "Where did I park my car?" syndrome, when returning to the parked car. In our society where time, convenience and comfort are precious commodities parking is a major perk, or major headache.

Parking Detection System is the next generation of urban parking and the answer to the most demanding need of any driver—Where to park?

The disclosed system, a method of self organizing sensors' network will enable municipalities and other parking authorities to easily identify, exploit and manage revenue opportunities while at the same time providing better service at a lower operating cost. With the implementation of the disclosed system, navigating and detecting available parking spaces will become part of the information revolution.

With the disclosed system, drivers will save time and reduce the frustration of hunting for parking spaces, and will also save money on gas use and car maintenance costs.

By using and modifying existing technology, the system will integrate easily with other transportation and communication systems. The RF sensor can be attached to existing parking meters, and in the future will interface with them and eventually will replace them.

Municipalities will have better control and centralized monitoring of their parking space inventory, resulting from the new generation of urban parking.

Special operating mode: NAVRealty 802,—A new unique tool to accommodate the real estate industry by providing the seller/the real estate agent as well as the real-estate customer to locate and navigate to the available real estate property in the "user" area, according to his location and directly to his GPS navigator and or cellular phone.

According to the newspaper association of America, the real estate advertising market is estimate at $11.5 Billion. Recently Mynewplace™ joined apartments.com and rent-.com in the $3 Billion on-line apartment listing Zillow™, a new startup company just raised $32M in founding with base idea to put your house on Google Earth™ satellite mapping, Google™, Yahoo™, AOL™, ASK™ and Microsoft™ are looking to develop real estate products.

It is believed that the unique innovation bring the listing to the user's hand, by combining the GPS navigation and or cellular phone the user will be allowed to get the real estate property in his area according to his location in real time without need for any communication, Internet or cellular.

The user even will have the option to "search out of the box" of property in his area. The disclosed innovation will serve as a new tool for the real estate industry as well to the search eng. For the benefit of the seller/the real estate agent as well as the real-estate customer.

Special operating mode:—NAV4STORE and NAVMALL 803, provides navigation inside a store/department store to a specific department/aisle or specific product, with option for advertising method and special promotion. Explore the indoor mall or inside a department store, navigate to the right place or the store or the department that you need.

Navigate on the mall map/store mapping to find your way around all using your cellular phone or navigation system without a GPS. A new kind of service and new marketing way for the malls/store business owners. An add-on to local advertising.

The local advertising market estimates to be $134 Billion in US alone. The mapping is the "forefront" of a local strategy, due to the lack of availability of the GPS indoor as well with the limitation of its accuracy outdoor and the un-updated of the mapping that provide today by the mapping and GPS industry there is no real tapping to this huge market.

It is believed that the disclosed innovation can bring a new life to the Navigation and mapping industry by providing a unique innovation that combine the GPS and the existing navigation as well as the cellular phone users with an indoor navigation based on the local map/mall that will provide the user a navigation to his desire location in the mall/store to the right store/product even isle inside the store as well a new marketing tool to the store/mall owner to get the customer with a new service. The store will have also an option to deliver more content (advertising, sale, coupons, promo etc.) to the user when he approach the store or already is inside via Bluetooth push to the user cellular Bluetooth enable.

Special operation mode:—NAV4SALE 804, provides navigation to the special sale item in a department store. A new unique tool for the business owner as well to the customers—to navigate and locate Item in a store/mall that is on a special sale, will provide the "user" a way to navigate in/out door for the "waypoint" represent special sale, coupon, special event, promo etc . . . an add-on to local advertising.

The local advertising market estimates to be $134 Billion in the US alone. The mapping is the "forefront" of a local strategy, due to the lack of availability of the GPS indoor as well with the limitation of its accuracy outdoor and the un-updated of the mapping that provides today by the mapping and GPS industry there is no real tapping to this huge market.

It is believed that the disclosed innovation can bring a new life to the navigation and mapping industry by providing a unique innovation that combines the GPS and the existing navigation as well as the cellular phone users with an indoor navigation based on the local map/mall that will provide the user a navigation to his desire location in the mall/store to the right store/product even isle inside the store as well a new marketing tool to the store/mall owner to get the customer with a new service. A new unique way to bring the customers to the product in sale, direct the customer directly to the isle and to the product that you want to move. The store will also have an option to deliver more content (advertising, sale, coupons, promo etc.) to the user when he approach the store or already is inside via Bluetooth push to the user cellular Bluetooth enable.

Special operating mode:—Museums—NAV4Museums NAV SHOW and NAV CONFERENCE 805, provides navigation and interactive information from the museum's show or conference exhibition to the "user's" cellular phone device via Bluetooth interface.

Explore museum or conference show exhibits in a new unique and easy way, find your way around when navigating on the floor map of the museum conference or the show, indoor navigation, navigate to exhibits restaurants, cafes, lavatories etc . . . . All to the "user" navigation or cellular phone.

Any Museum Conference or show provided to the attended a mapping to the exhibits, some provide also additional audio device (headset) to get more information on the exhibits.

The disclosed innovation will provide a unique indoor tools that will allow the attended to navigate the museum, conference or show in an easy way directly to his Bluetooth enable cellular phone, when he reach his desire exhibit he will allow to download directly to his cellular and or Bluetooth headset information about the exhibits. An indoor navigation to the exhibits as well to the restaurants, cafes, lavatories etc . . . . All to the "user" navigation or cellular phone and based on the facility map.

Special operating Mode: Navtrain 806,—For all the users of mass transportation system the disclosed innovation will allow, locate and point the "user" to the exact station or location on a route, an easy way to navigate in the train, subway, underground kind of system, a new way of "subway" or bus mapping in/out door. And directly to the user navigation or his cellular phone. Every day millions of people are using the mass transportation system, trains, subways, buses, each of the passengers depend on the transportation map for the route information as well as schedules and additional services provided by the transportation system. Most of the passengers of today carry with them a cellular phone. The disclosed unique innovation will provide the passenger with the navigation inside the transportation system directly to the passenger's Bluetooth enable phone, the passenger will know exact location/station on the route as well with additional option information like schedules. A new add-on service to the transportation providers as well to the passengers, utilize the indoor navigation method.

Special operating mode:—NAVThemePark, NAVPark 807,—Theme and amusements Park navigation, navigate to your desire attraction as well with a new way for register to a "fast pass" kind off lane . . . all in a easy way to the "user" cellular phone without need for GPS. Provide a new media and—on service.

Ever wonder what it will be like to navigate inside the amusements park to the desire attraction to know the schedules of the shows events at the attractions and even to get your "fast pass" like from a remote instead of standing in line.

With the unique innovation all can be become reality and directly to your cellular phone without the need for a GPS.

It is believed that the disclosed innovation can provide a new tool and service to the benefit of the amusements parks as well to the user.

Special operating mode:

NAV EMERGENCY 808, One of the important features of the indoor navigation techniques will enhance the ability of tactical team's first response team to navigate within the buildings in which it has been deployed.

The disclosed method provides a low-cost, reliable system for firefighters and other first responders, inside buildings, to navigate, where a GPS is not reliable-indeed, the GPS signal may have been disabled temporarily to prevent exploitation by terrorists, or even more likely no signal can be received at all inside a building.

The disclosed system envisioned this limitation of GPS based systems, and is intended for an environment that is potentially much less "friendly", the environment inside a building that first responders encounter may contain smoke, dust, or flames, and is intended to leverage advances in ubiquitous RF/Bluetooth tag technology.

The disclosed system will exploit the capability of storing critical building information, such as the floor maps and the emergency escape plans, for retrieval and navigational assistance via a Bluetooth enabled cellular phone, when and where it is needed, More over the system can serve as a navigator for the emergency exit route when and where needed each user can load the emergency exit floor plan and escape with the knowledge of his exact location in that route.

Aspects of the scenarios to be included:
Identifies and tracks the user (a first response team member).
Provides the user with navigation information and directions for safely exiting of the building.
Provides location information of all team members, via an ad hoc network of radio terminals that combine RF/Bluetooth readings and radio communication.

From the outset, the disclosed system was been designed with the capability to utilize existing technology so it can be deployed as a stand-alone system, or in tandem with existing systems. We focused on technology already in place that simply needs to be expanded. With the implementation of the disclosed system, a FIRST RESPONSE TEAM will be empowered to navigate and find its way in a case of emergency or a disaster. This capability can be a critical life saving power in modern congested urban living conditions, not available before now.

It is believed that implementation of the disclosed system will assist counter terrorism activities and more importantly will help the first response teams to save the lives of people trapped inside buildings.

It is believed that implementation of the disclosed system will assist counter terrorism activities and more importantly will help the first response teams to save the lives of people trapped inside buildings. It can save life.

Figure 9:
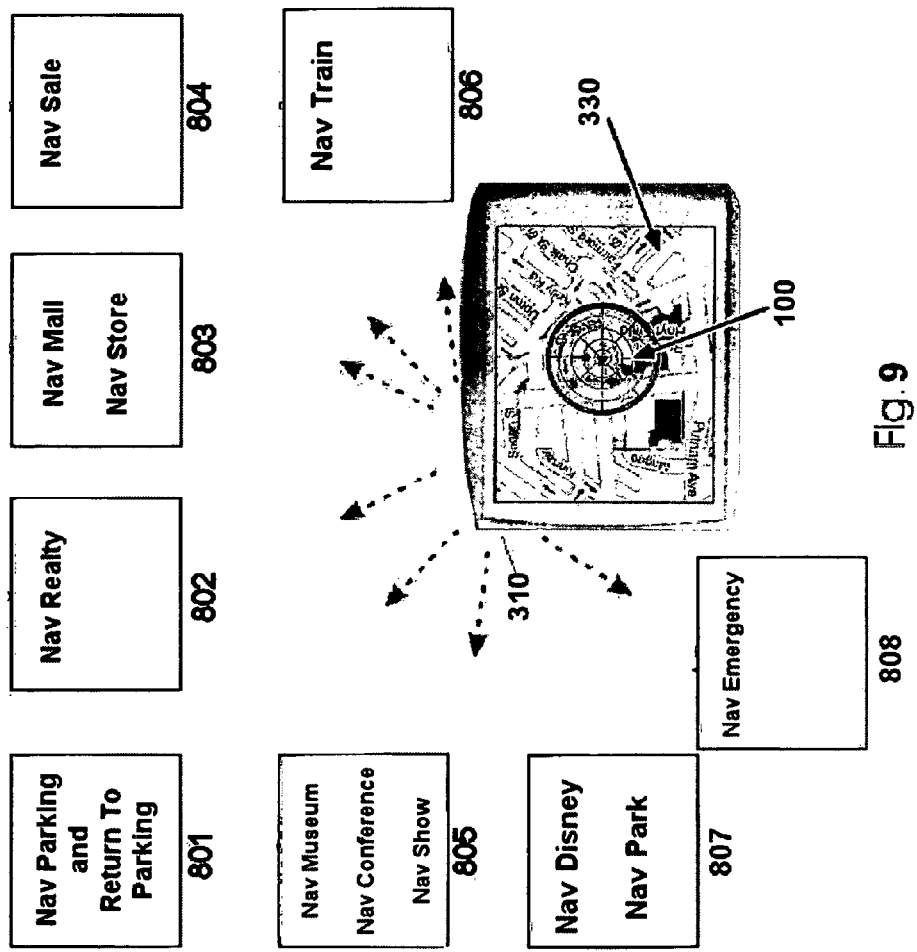
FIG. 9 is an illustration of the application for the automatic waypoint update utilizing a car navigation in accordance with the present invention.

Turning to FIG. 9. is an illustration of the possibility application for automatic waypoints generation utilize a car navigation 310 with the floating circular method 100 running and floating on GPS mapping in the background 330 or without any mapping.

Special operating mode: —Parking—NAV4PARKING and Return to Parking 801, describe in 2 patent applications, provide empty parking space detection and navigation.

A new generation of urban parking innovation that answers the most demanding need of any driver—Knowing where to park . . . !, or more precisely, find and navigate to the empty parking spaces in and around the driver. Also will provide answer to "where did I park my car?" syndrome, when returning to the parked car. In our society where time, convenience and comfort are precious commodities parking is a major perk, or major headache.

Parking Detection System is the next generation of urban parking and the answer to the most demanding need of any driver—Where to park?

The disclosed system, a method of self organizing sensors' network will enable municipalities and other parking authorities to easily identify, exploit and manage revenue opportunities while at the same time providing better service at a lower operating cost.

With the implementation of the disclosed system, navigating and detecting available parking spaces will become part of the information revolution.

With the disclosed system, drivers will save time and reduce the frustration of hunting for parking spaces, and will also save money on gas use and car maintenance costs.

By using and modifying existing technology, the disclosed system will integrate easily with other transportation and communication systems. The RF sensor can be attached to existing parking meters, and in the future will interface with them and eventually will replace them.

Municipalities will have better control and centralized monitoring of their parking space inventory, resulting from the new generation of urban parking.

Special operating mode: NAVRealty 802,—A new unique tool to accommodate the real estate industry by providing the seller/the real estate agent as well as the real-estate customer to locate and navigate to the available real estate property in the "user" area, according to his location and directly to his GPS navigator and or cellular phone.

According to the newspaper association of America, the real estate advertising market is estimate at $11.5 Billion. Recently Mynewplace™ joined apartments.com and rent.com in the $3 Billion on-line apartment listing Zillow™, a new startup company just raised $32M in founding with base idea to put your house on Google Earth™ satellite mapping, Google™, Yahoo™, AOL™, ASK™ and Microsoft™ are looking to develop real estate product.

It is believed that the unique innovation bring the listing to the user's hand, by combining the GPS navigation and or cellular phone the user will be allowed to get the real estate property in his area according to his location in real time without need for any communication, Internet or cellular.

The user even will have the option to "search out of the box" of property in his area. The disclosed innovation will serve as a new tool for the real estate industry as well to the search eng. For the benefit of the seller I the real estate agent as well as the real-estate customer.

Special operating mode:—NAV4STORE and NAVMALL 803, provides navigation inside a store/department store to a specific department/aisle or specific product, with option for advertising method and special promotion. Explore the indoor mall or inside a department store, navigate to the right place or the store or the department that you need.

Navigate on the mall map/store mapping to find your way around all using your cellular phone or navigation system without a GPS. A new kind of service and new marketing way for the malls/store business owners. An add-on to local advertising.

The local advertising market estimates to be $134 Billion in US alone. The mapping is the "forefront" of a local strategy, due to the lack of availability of the GPS indoor as well with the limitation of its accuracy outdoor and the un-updated of the mapping that provide today by the mapping and GPS industry there is no real tapping to this huge market.

It is believed that the disclosed innovation can bring a new life to the Navigation and mapping industry by providing a unique innovation that combine the GPS and the existing navigation as well as the cellular phone users with an indoor navigation based on the local map/mall that will provide the user a navigation to his desire location in the mall/store to the right store/product even isle inside the store as well a new marketing tool to the store/mall owner to get the customer with a new service. The store will have also an option to deliver more content (advertising, sale, coupons, promo etc.) to the user when he approach the store or already is inside via Bluetooth push to the user cellular Bluetooth enable.

Special operation mode:—NAV4SALE 804, provides navigation to the special sale item in a department store. A new unique tool for the business owner as well to the customers—to navigate and locate Item in a store/mall that is on a special sale, will provide the "user" a way to navigate in/out door for the "waypoint" represent special sale, coupon, special event, promo etc., an add-on to local advertising.

The local advertising market estimates to be $134 Billion in the US alone. The mapping is the "forefront" of a local strategy, due to the lack of availability of the GPS indoor as well with the limitation of its accuracy outdoor and the un-updated of the mapping that provides today by the mapping and GPS industry there is no real tapping to this huge market.

It is believed that the disclosed innovation can bring a new life to the navigation and mapping industry by providing a unique innovation that combines the GPS and the existing navigation as well as the cellular phone users with an indoor navigation based on the local map/mall that will provide the user a navigation to his desire location in the mall/store to the right store/product even isle inside the store as well a new marketing tool to the store/mall owner to get the customer with a new service. A new unique way to bring the customers to the product in sale, direct the customer directly to the isle and to the product that you want to move. The store will also have an option to deliver more content (advertising, sale, coupons, promo etc.) to the user when the user approaches the store or is already inside the store via Bluetooth push to the user cellular Bluetooth enable.

Special operating mode:—Museums—NAV4Museums NAV SHOW and NAV CONFERENCE 805, provides navigation and interactive information from the museum's show or conference exhibition to the "user's" cellular phone device via Bluetooth interface.

Explore museum or conference show exhibits in a new unique and easy way, find your way around when navigating on the floor map of the museum conference or the show, indoor navigation I navigate to exhibits restaurants, cafes, lavatories etc., all to the "user" navigation or cellular phone.

Any Museum Conference or show provided to the attended a mapping to the exhibits, some provide also additional audio device (headset) to get more information on the exhibits.

The disclosed innovation will provide a unique indoor tools that will allow the attended to navigate the museum, conference or show in an easy way directly to his Bluetooth enable cellular phone, when he reach his desire exhibit he will allow to download directly to his cellular and or Bluetooth headset information about the exhibits. An indoor navigation to the exhibits as well to the restaurants, cafes, lavatories etc., all to the "user" navigation or cellular phone and based on the facility map.

Special operating Mode: Navtrain 806,—For all the users of mass transportation system the disclosed innovation will allow, locate and point the "user" to the exact station or location on a route, an easy way to navigate in the train, subway, underground kind of system, a new way of "subway" or bus mapping in/out door. And directly to the user navigation or his cellular phone. Every day millions of people are using the mass transportation system, trains/subways, buses, each of the passengers depend on the transportation map for the route information as well as schedules and additional services provided by the transportation system. Most of the passengers of today carry with them a cellular phone. The disclosed unique innovation will provide the passenger with the navigation inside the transportation system directly to the passenger's Bluetooth enable phone, the passenger will know exact location/station on the route as well with additional option information like schedules. A new add-on service to the transportation providers as well to the passengers, utilize the indoor navigation method.

Special operating mode:—NAVThemePark NAVPark 807,—Theme and amusements Park navigation, navigate to your desire attraction as well with a new way for register to a "fast pass" kind off lane . . . all in a easy way to the "user" cellular phone without need for GPS. Provide a new media and—on service.

Ever wonder what it will be like to navigate inside the amusements park to the desire attraction to know the schedules of the shows events at the attractions and even to get your "fast pass" like from a remote instead of standing in line. With the unique innovation all can be become reality and directly to your cellular phone without the need for a GPS. It is believed that the disclosed innovation can provide a new tool and service to the benefit of the amusements parks as well to the user.

Special operating mode:

NAV EMERGENCY 808, One of the important features of the indoor navigation techniques will enhance the ability of tactical team's first response team to navigate within the buildings in which it has been deployed.

The disclosed method provides a low-cost, reliable system for firefighters and other first responders, inside buildings, to navigate, where a GPS is not reliable-indeed, the GPS signal may have been disabled temporarily to prevent exploitation by terrorists, or even more likely no signal can be received at all inside a building.

The disclosed system envisioned this limitation of GPS based systems, and is intended for an environment that is potentially much less "friendly", the environment inside a building that first responders encounter may contain smoke, dust, or flames, and is intended to leverage advances in ubiquitous RF/Bluetooth tag technology.

The disclosed system will exploit the capability of storing critical building information, such as the floor maps and the emergency escape plans, for retrieval and navigational assistance via a Bluetooth enabled cellular phone, when and where it is needed, More over the disclosed system can serve as a navigator for the emergency exit route when and where needed each user can load the emergency exit floor plan and escape with the knowledge of his exact location in that route.

Aspects of the scenarios to be included:
Identifies and tracks the user (a first response team member).
Provides the user with navigation information and directions for safely exiting of the building.
Provides location information of all team members, via an ad hoc network of radio terminals that combine RF/Bluetooth readings and radio communication.

From the outset, the disclosed system was been designed with the capability to utilize existing technology so it can be deployed as a stand-alone system, or in tandem with existing systems. We focused on technology already in place that simply needs to be expanded. With the implementation of the disclosed system, a FIRST RESPONSE TEAM will be empowered to navigate and find its way in a case of emergency or a disaster. This capability can be a critical life saving power in modern congested urban living conditions, not available before now.

It is believed that implementation of the disclosed system will assist counter terrorism activities and more importantly will help the first response teams to save the lives of people trapped inside buildings.

It is believed that implementation of the disclosed system will assist counter terrorism activities and more importantly will help the first response teams to save the lives of people trapped inside buildings. It can save life.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method of navigation for use in indoor and outdoor on a display device, the display device being selected from a group of display devices comprising a mobile phone, a hand held navigation system, a vehicle navigation system and a Bluetooth enabled device, the method comprising steps of:
receiving a beacon signal directly from at least one proximity installed RF beacon in the local area, wherein said beacon signal is at least one of a Wi-Fi signal and a Bluetooth signal;
utilizing the received signal to determine a location of the display device;
determining waypoints that are located in a proximity of the display device;
transmitting waypoint content information associated with the proximate waypoints to the display device, wherein the content information includes at least one of a merchant location, a type of merchant, merchant business hours, a coupon, a deal, and an advertisement;
generating automatic navigating between waypoints according to a user location; and
displaying location information in a floating circular omni directional overlay navigation map on the display device.

2. The method of navigation according to claim 1, wherein said RF beacons are installed at a known location, wherein said known location is associated with a waypoint.

3. The method of navigation according to claim 1 wherein said RF beacons are one of a Bluetooth device or a Wi-Fi device.

4. The method of navigation according to claim 1, further comprising a step of displaying said information over one of a facility map, area map, GPS mapping or floor plan on the user mobile phone device or the display device.

5. The method according to claim 1, wherein the information is associated with local waypoints in a current indoor or outdoor area to assist GPS or Cellular location identification, providing pinpoint accuracy of the way point.

6. The method according to claim 1, further comprising a step of determining a current position of a user employing at least one of triangulation based calculations and proximity based calculations utilizing known positions of said wireless RF Wi-Fi or Bluetooth beacons installed at known positions in the facility area or building designated as Infrastructure for indoor local business services (LBS) and indoor navigation.

7. The method according to claim 1, which further comprises allowing displaying content information or advertising of waypoint, wherein said content information includes at least one of: associated hours of operation, deals, coupons, and local advertisements.

8. The method according to claim 1, further comprising a step of providing said display device with application software enabling a display at least one of area maps and facility floor plans.

9. The method according to claim 1, further comprising steps of:
   utilizing at least one of a group of floor layer identifying processes to identify a floor location of said display device, wherein said group of floor layer identifying processes includes:
      utilizing unique RF beacon identifiers, wherein each unique RF beacon identifier is associated with a location of each RF beacon of said plurality of beacons to determine a precise floor location;
      utilizing a signal strength of said RF beacons to determine said precise location of said display device on a floor;
      utilizing triangulation of a plurality of identified RF beacon locations proximate said display device to determine said precise floor location; and
   displaying said precise floor location on a floor layer number.

10. The method according to claim 1, further comprising a step of displaying a current position of said display device upon a map comprising a floor location and a floor layer number of a multi-floor structure.

11. The method according to claim 1, further comprising a step of providing infrastructure for indoor or outdoor navigation in an area comprising at least one of:
   a mall, a store, a department store, a specialty store, a conference, a trade show, an amusement park, a university, a hospital, a school, a municipal building, a museum, a subway, a train station, an airport, a hotel, a resort, a financial institution, a cruise ship, a down town center, a parking facility, and any location where GPS cannot determine an accurate location of said display device.

12. The method according to claim 11, further comprising at least one of the following steps:
   determining available parking spaces in a vicinity of said display device and providing navigation to a user by displaying available parking spaces on said display device, wherein each parking space is associated with at least one RF beacon, and
   identifying a location of a parked car associated with said display device and providing navigation to return said user to said location of said parked car through a display on said display device.

13. The method according to claim 11, further comprising steps of:
   providing navigation to said display device inside at least one of a store and a department store to at least one of a specific department, an aisle, and a specific product, and conveying at least one of advertising, a discounted item, and a special promotion to said display device.

14. The method according to claim 11, further comprising a step of navigating to a location containing one of a sale item and a coupon related item in at least one of a store and a department store.

15. The method according to claim 11, further comprising a step of providing indoor navigation in the museum, the show, or conference exhibition, directly to the display device, utilizing the RF Wi-Fi or Bluetooth beacons the display device can receive additional information and at least one of audio and video eliminating a need of a rental headset.

16. The method according to claim 11, further comprising a step of providing pinpoint navigation for real estate property currently listed for at least one of sale, lease, and rent and navigation to a user according to the display device location as an add-on to a GPS navigation, identification of said RF beacon identifier initiates delivery of additional content associated with the real estate directly to the display device.

17. The method according to claim 11, further comprising a step of providing exhibit and attractions waypoints in an outdoor and indoor environment of facilities located within the amusement park and interactive information from exhibits within said amusement park to the display device, said navigation presents exhibit information in conjunction with waypoint locations on a map of the amusement park, wherein said information includes at least one of a schedule of a show, availability of said show, a classification of said waypoint, wherein said classification includes at least one of a restroom, a food area and a capability of providing an accelerated ride access function thus reducing time waiting in an access line.

18. The method according to claim 11, further comprising steps of providing guidance in an emergency situation including navigation, alarming, and notification to an emergency exit route,
   determining and presenting updated navigation information directing a user to safely exit an associated structure, wherein said emergency exit route is determined using an emergency exit floor plan and a location of said display device, wherein said location of said display device is determined and updated utilizing information associated with said RF beacons, wherein at least a portion of said RF beacons are located along said emergency exit route.

19. The method according to claim 11, further comprising a step of providing said display device with an exact location of said display device when said display device is located in a train, a bus or within a subway station on a route, wherein said exact location of said display device is determined using deployed RF beacons and said exact location of said display device is shown on an associated route map displayed on said display device, wherein said associated route map further presents additional information, wherein said additional information includes at least one of a schedule, a restroom, a food location, and an emergency exit route.

20. The method according to claim 11, further comprising steps of:
   generating waypoints of road signs, wherein each road sign is associated with a respective RF beacon and
   displaying said road signs on an associated map on the display device providing assistance to a user for secure driving, wherein the information can interface with a car computer directing said car computer to automatically slow down when enter school zone.

21. The method according to claim 1, further comprising steps of:
installing a series of at least one of Wi-Fi and Bluetooth beacons in at least one of an area and a building in a known location;
providing a triggering mechanism and proximity locating engine as infrastructure for at least one of indoor navigation and local business service (LBS) applications,
designating a way point for each business, wherein each business provides a payment designate for displaying said waypoint information associated with said business, wherein said waypoint pinpoints an exact location and additional information associated with said business on said display device;
initiating at least one of an action and an event upon receipt of an associated RF beacon identifier, wherein said at least one of an action and an event is associated with said waypoint, wherein said waypoint is determined based upon an RF beacon identifier located proximate said display device;
conveying at least one of additional information and advertisements associated with said business to said display device when said RF beacon determines that said display device is at a location proximate said business.

22. The method according to claim 1, further comprising steps of:
initiating a local business services (LBS) application upon receipt of an associated RF beacon identifier, wherein said local business services (LBS) application presents at least one of a deal, a coupon, and an advertisement associated with said waypoint on said display device, wherein said waypoint is determined based upon an RF beacon identifier located proximate said display device.

23. The method according to claim 1, further comprising a step of:
initiating a response from an outside information provider, wherein said response is initiated by receipt of a communication from said display device, wherein said communication includes at least one of said display device location, an RF beacon identifier, and a display device identity.

24. The method according to claim 1, further comprising steps of:
determining a location of one of a train or a bus utilizing a series of RF beacons deployed along a route of said one of said train or bus; and
providing said display device with an exact location of said one of said train or bus along said route, wherein said exact location of said display device is shown on an associated route map displayed on said display device.

* * * * *